United States Patent [19]

Hartmann

[11] 3,881,590

[45] May 6, 1975

[54] ELEVATOR CONVEYOR

[76] Inventor: Karl Hartmann, Liebrechtstrasse 37, 4130 Moers-Utfort, Germany

[22] Filed: Jan. 22, 1971

[21] Appl. No.: 191,929

[52] U.S. Cl. .................. 198/162; 198/165; 198/230
[51] Int. Cl. ............................................. B65g 15/14
[58] Field of Search .......... 198/153, 154, 162, 163, 198/165, 201, 230, 140, 142

[56] References Cited
UNITED STATES PATENTS

| 304,998 | 9/1884 | Everett | 198/142 |
|---|---|---|---|
| 1,571,365 | 2/1926 | Bausman | 198/230 |
| 2,978,095 | 4/1961 | Jenike | 198/165 |
| 3,593,838 | 7/1971 | Latone | 198/140 |
| 3,633,428 | 1/1972 | Pott | 198/154 |

FOREIGN PATENTS OR APPLICATIONS

| 729,983 | 3/1966 | Canada | 198/201 |
|---|---|---|---|
| 1,081,588 | 12/1954 | France | 198/201 |
| 843,527 | 7/1949 | Germany | 198/165 |
| 713,552 | 9/1966 | Italy | 198/165 |

Primary Examiner—Evon C. Blunk
Assistant Examiner—Joseph E. Valenza
Attorney, Agent, or Firm—Stein and Orman

[57] ABSTRACT

An elevator conveyor including a plurality of partitions which define material carrying pockets wherein the partitions are arranged in spaced relation to one another on the interior surface of an endless conveyor belt which is guided around a plurality of driving wheels such that the path of the conveyor belt extends along a substantially vertical portion. The material carrying pockets are further defined by side walls having a corrugated configuration and which are disposed in substantially contiguous relation to the ends of the partition but are not joined to them. The partitions are substantially inclined at an acute angle relative to the plane of the conveyor belt to which they are attached and in the direction of travel of the belt as may be the side walls. Loading and delivery stations are oppositely disposed at the bottom and top of the conveyor respectively such that loading and discharge of the conveyor may be affected by gravity.

8 Claims, 5 Drawing Figures

PATENTED MAY 6 1975

INVENTOR:
KARL HARTMANN

BY: *Law Offices of Stein & Orman*

ATTORNEYS.

ELEVATOR CONVEYOR

RELATED APPLICATION

An application on the subject invention was first filed by applicant in Germany on October 22, 1970 and by virtue of such foreign application a right of priority is hereby claimed.

BACKGROUND OF THE INVENTION

Known elevator conveyors of this construction for example elevators, bucket elevators, trough belt conveyors, pocket belt conveyors or steel plate conveyors suffer from basic disadvantages inherent in their structure. Because of the method of operation utilized by such conveyors in scooping up or engaging the conveyed material the particle size of such conveyed material is severely limited. In addition there is a constant and substantial wear on the various structural elements of these conveyors including buckets, belt mountings and joints due to the conveyed material tending to adhere readily in these elements. The particle size also effects the capacity of such conveyors. In most cases it is necessary for such conveyors to be enclosed because of the consistency or texture of the conveyed material causes it to be readily scattered. Even in conveyors to which material is fed and which do not use a scooping action, the previous mentioned or similar defects and problems are present. Regardless of the type conveyor utilized additional disadvantages are universally present because of prior art design configurations. These include high maintenance and setting up costs, unreliability and generally bulky, unnecessarily complicated machine parts resulting in higher initial cost.

Accordingly, it can be readily seen that there is a need in the conveyor industry for an elevator or vertical conveyor wherein conveyed material is to be fed only to the "conveying portion" of the device and be excluded from the working parts. This of course is necessary in order to reduce wear and to enable higher operating speeds to be obtained which in turn provide a higher delivery rate. In addition such a conveyor belt should be so constructed that inadvertent leakage, spillage or back-flow of the conveyed material during the vertical run is rendered impossible. At the same time the "conveying portion" of the conveyor should be capable of desirable working motion during conveying. This avoids dead pocket corners and prohibits unwanted retention of the conveyed material on the conveyor after being transported to a delivery point. This retained material is often extremely difficult to remove and reduces delivery rates. To the extent to which the conveyed material is not completely delivered any residue should remain in circulation with the conveyed material and should be returned or delivered as desired without loss.

Ideally the design of the conveyor and material from which it is formed should make it possible to convey materials of various consistencies which can normally be conveyed only with great difficulty regardless of particle sizes corrosive nature and texture of the conveyed material. Such an elevator conveyor should be designed to operate with as little noise as possible and all movable parts should be easily accessible. The design configuration should be as simple as possible thereby allowing the conveyor to operate efficiently with little maintenance, be reliable and be installed in a relatively small space.

SUMMARY OF THE INVENTION

The present invention relates to an elevator type conveyor comprising a plurality of partitions mounted on the interior surface of an endless circulating conveyor belt. Side walls extend along the length of and on each side of the belt. These side walls have a corrugated configuration and are positioned contiguous to each end of the partitions. The partitions form a substantially acute angle with the conveyor belt plane and as pointed out above the end of said partitions bear closely on the oppositely disposed corrugated side walls without being fixedly joined thereto. The marginal free longitudinal edges of the conveyor extend outside or beyond the corrugated side walls and are positioned to have the interior surface thereof bear on the driving wheels, thereby propelling the conveyor.

In a particularly advantageous embodiment of the elevator conveyor according to the present invention, the corrugations of the side walls are angularly oriented to the plane of the belt to form substantially the same acute angle with the conveyor belt plane as is formed by the partitions. Each partition thereby engages two oppositely disposed corrugation troughs of the side walls.

A loading station whereat material to be conveyed is delivered to the belt which is provided between two driving stations located at the bottom of the conveyor assembly on the interior of the belt. These two lower driving stations are arranged so that the belt passes therebetween substantially horizontally thereby arranging the partitions in a substantially vertical orientation for receiving the conveyed material. In addition, a discharge funnel is appropriately mounted below the conveyor belt as it passes through its uppermost horizontally oriented positions between an uppermost pair of driving stations. The partitions are positioned in a vertically oriented inverted position so that the conveyed material can fall therefrom into the discharge funnel.

A striker apparatus adapted to insure removal of the conveyed material from the belt acts on the external surface of the conveyor belt. The striker is preferably disposed above the conveyor belt between the uppermost driving station which are arranged in spaced relation to one another.

The elevator conveyor may be optionally provided with a convering belt disposed along the vertical path of the conveyor wherein the material being conveyed is lifted to the discharge station. The covering belt is endless and is guided over two driving drums situated co-axially relative to a pair of driving wheels but being journalled separately thereof. The covering belts is adapted to cover the top of the partition of the conveyor belt and are co-movable with the corrugated side walls by frictional engagement therewith. The driving drums are constructed to ensure that the upper edges of the corrugated side walls of the conveyor belt only lightly touch the covering belt in the zone of the driving drums.

The present invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawing in which.

Similar reference characters refer to similar parts throughout the several views of the drawings.

DETAILED DESCRIPTION

Figure 1:
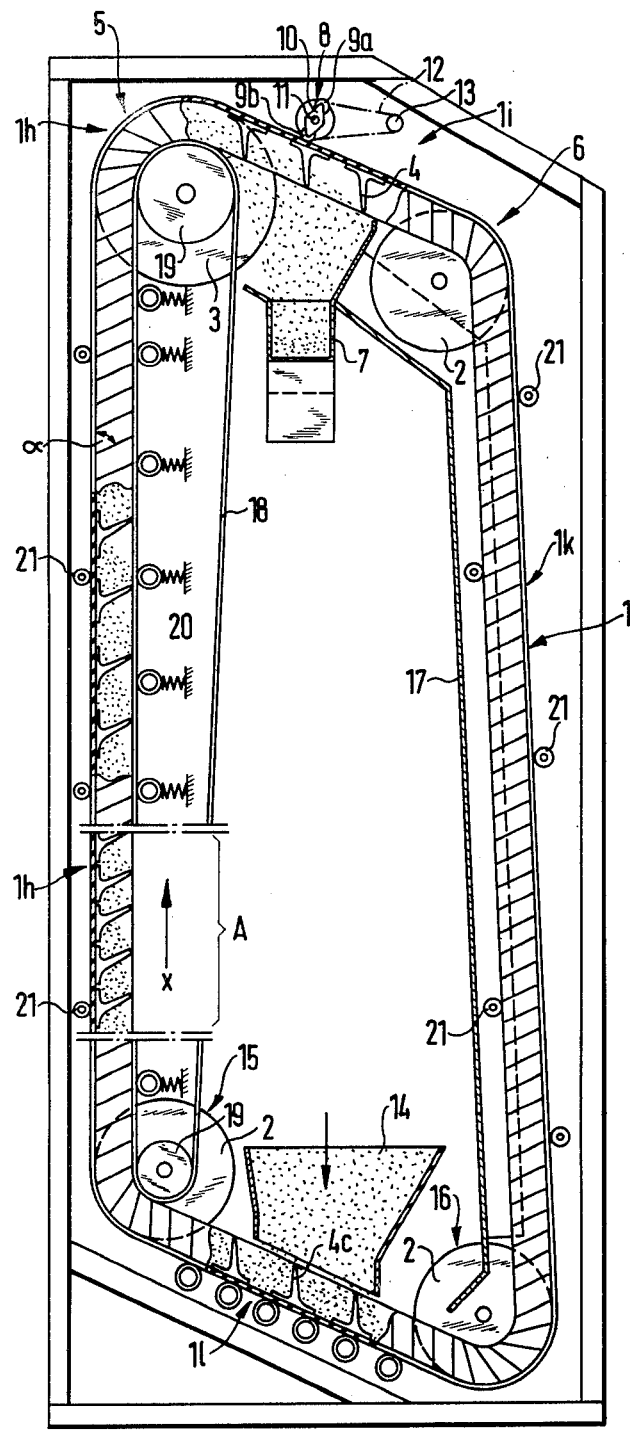
FIG. 1 is a view of an elevator conveyor of the present invention.

As shown in FIG. 1 the subject invention comprises an elevator conveyor having an endless conveyor belt 1 guided over driving wheels 2 and 3. Due to a relative location of these wheels belt 1 is guided in a substantially vertical plane for a substantial portion of its path.

Partitions 4 which at least partially define the individual material carrying pockets are mounted on the interior of the circulating surface of the conveyor belt 1 between side walls 1a, and 1b. These side walls have a corrugated configuration that extend along the length of the belt in spaced relation to one another. The partitions 4 are inclined for the conveying direction indicated by directional arrow x thereby forming a substantially acute angle. The edges 4a and 4b of each partition is disposed adjacent to the oppositely disposed corrugated side walls 1a and 1b without being joined thereto. Longitudinally extending marginal edges 1f and 1g of the conveyor belt located outside side walls 1a and 1b engage the driving wheels 2 and 3 as shown.

A driving station 5 is provided at the upper end of the conveyor path 1h and another driving station 6 is situated downstream of the driving station 5 in the circulating direction x of the conveyor belt 1. When passing between station 3 and 6 the partition 4 are orientated approximately vertically downwardly. This ensures complete emptying of the conveyor belt due to gravitational force acting on the conveyed material. A discharge funnel 7 which delivers the conveyed material either into a container or into additional conveying means disposed downstream thereof is mounted below the conveyor path indicated generally as 1i in FIG. 1.

In order to reliably discharge conveyed material which is generally harder to handle for example moist or sticky material, a striker apparatus 8 is provided. This apparatus comprises two rotating rollers 9a and 9b disposed above the conveyor path at 1i between the driving station 5 and the downstream driving station 6. The rollers 9a and 9b are mounted on oppositely disposed ends of roller retaining means 10, fixedly disposed on a shaft 11. The shaft 11 may be driven by a prime mover 13 through a flexible member 12. The drive may in appropriate cases also be obtained from the driving station 5. The impact acting of the rollers cause parts of the conveyed material retained on the conveyor belt to be detached therefrom enabling them to drop into the funnel 7.

A loading station 14 is disposed between two lower driving stations 15 and 16 on the interior of the conveyor belt. This allows the conveyed material to be efficiently loaded on the conveyor belt through a material directing funnel. Loading of the material occurs through the gravitation due to the partitions 4 being positioned vertically upwards in the zone of the loading station at 4c. The partitions are so disposed because of the guiding of the conveyor belt between the two lower driving stations 15 and 16 in a substantially horizontal but somewhat inclined plane.

A trough 17 is arranged in communicating relation between areas adjacent the discharge and delivery stations. This trough serves to collect the last remains of the conveyed material as it is detached from the empty belt 1k and return such material into circulation.

A covering belt 18 is optionally employed in particular cases and is guided in place relative to belt portion 11 over driving drums 19. These drums are co-axial to the driving wheels 2 and 3 of the driving stations 15 and 5 respectively but are separately journalled therefrom. The covering belt 18 is spring biased by pressure rollers 20 against the corrugated side wall 1a and 1b in order to form an enclosed conveying pocket. Other rollers 21 ensure vibration-free running of the conveyor belt. The rollers 20 are so constructed that the upper edges of the corrugated side walls of the conveyor belt are only lightly engaged by the covering belt throughout their contact zone. The covering belt is not used to close the pockets over a major portion of the conveyor path as indicated in FIG. 1.

Figure 3:
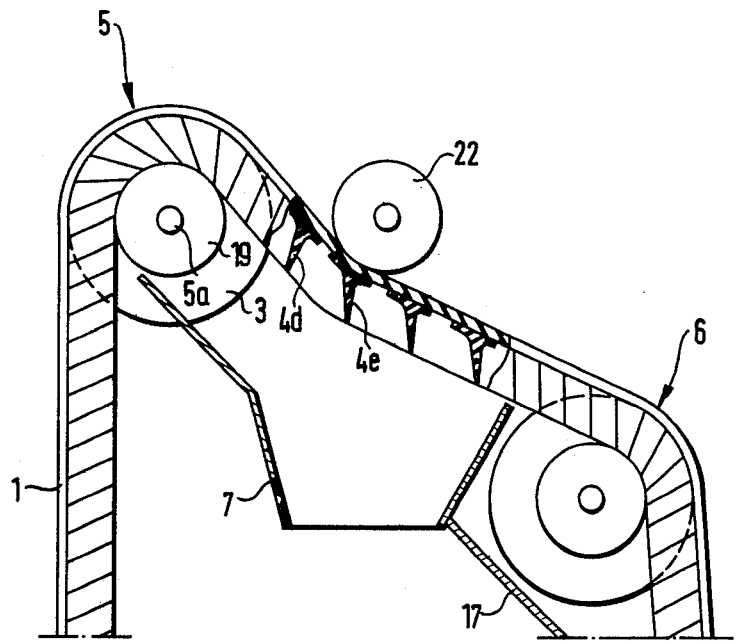
FIG. 3 is a partial sectional view of the delivery station of the subject conveyor with a tensioning or additional driving pulley.

FIG. 3 shows an alternative embodiment of the delivery station between the upper driving stations 5 and 6. The special feature of this embodiment may be seen in the additional provision of a tensioning pulley 22 designed to exert an additional working stress on the conveyor belt. As can be seen the drivers 4 are moved from a rearwardly disposed position at 4d to a substantially vertical oriented position at 4e after passing pulley 22. The tensioning pulley 22 may be constructed as an additional drive means either by being provided with its own drive or by means of a connection to the shaft 5a of the driving station. The tensioning pulley 22 also increases the angle of contact of the contact of the conveyor belt 1 on the section-free edges 1f and 1g (FIG. 1) of the conveyor belt and thus provides a better transfer of the driving forces. This is particularly important when a substantial weight of conveyed material are being transferred substantial vertical distances. Tensioning pulleys 22 may also be applied to the empty belt portion 1k and it is possible for a striker station to be additionally provided within the discharge section and downstream of the tensioning pulley to provide a further improvement in the facilities for cleaning the conveyor belt in the delivery zone.

Figure 2:
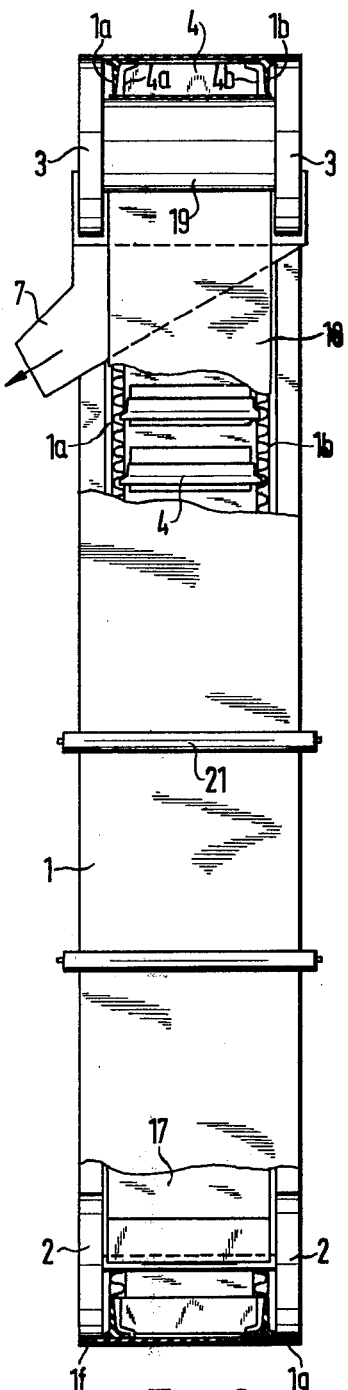
FIG. 2 is a side view of FIG. 1.
Figure 4:
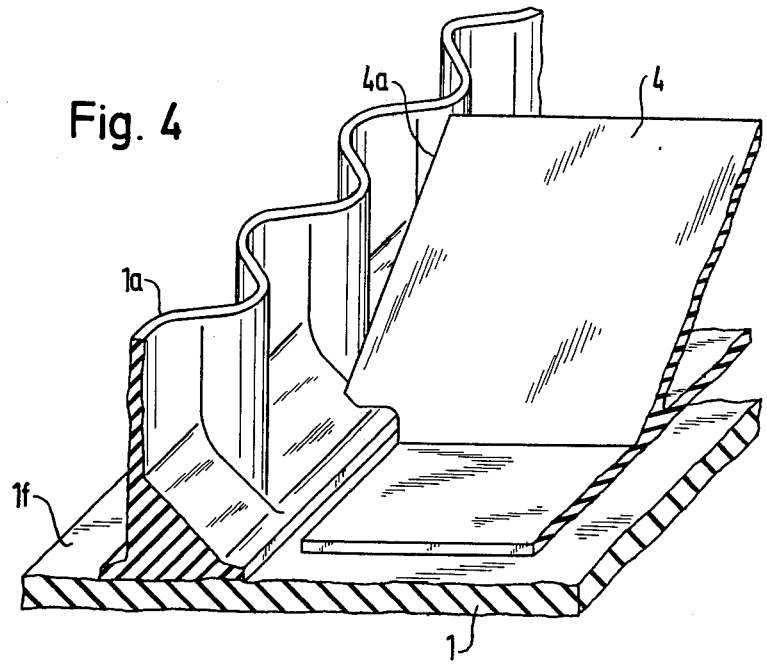
FIG. 4 is a sectional view of the conveyor belt with corrugated side walls arranged in predetermined relation to driving sections forming an acute angle with the conveyor belt plane.
Figure 5:
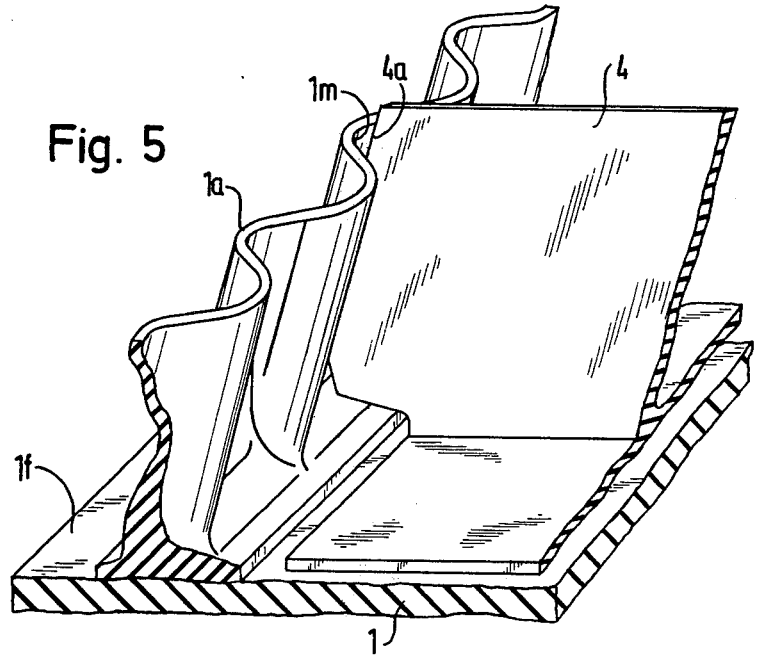
FIG. 5 is a sectional view showing the conveyor belt drivers as well as corrugations of the side walls disposed at an acute angle relative to the conveyor belt plane.

FIG. 4 shows a conveyor belt with corrugated side walls 1a and 1b in which the partitions 4 form an acute angle (FIG. 1) with the conveying direction x. The ends 4a and 4b of the partitions bear closely on the corrugations of the side walls 1a and 1b and the side walls 1a and 1b form a right angle with the conveyor belt plane. By contrast, FIG. 5 shows the conveyor belt illustrated in FIGS. 1 to 3 to an enlarged scale. In this case, the drivers 4, disposed to an acute angle (FIG. 1) relative to the conveying direction X are extended into the troughs 1m of the corrugations on the side walls 1a and 1b to form a completely sealed conveying pocket. The corrugations of the side walls 1a and 1b are disposed at substantially the same acute angle to the conveyor belt plane at which the partitions 4 are disposed.

The description hereinabove of the elevator conveyor discloses that the conveyed material may be efficiently loaded through the funnel 7 into the box-shaped conveying pockets of the conveyor belt. Wear accordingly results only due to the resilient impact stresses applied to the partitions 4. The vertical position of the partition in the zone of the loading station 14 improves loading so that higher operating speeds and therefore higher delivery rates can be obtained.

Only very fine-grained material flows back through the successively positioned conveying pockets by virtue of the fact that the ends of the drivers bear closely on the corrugated side walls but are not joined to them. However, the rearward flowing material is retained or entrained by the next partition. Practically complete sealing between the individual conveying pockets of the conveyor belt is achieved although, as in FIG. 5 the ends of the corrugations are extended into the corrugation troughs of the side walls on both sides. The side wall corrugations inclined in the running direction also force the conveyed material more readily on to the floor of the conveyor belt when the belt is inverted at the successively located driving stations downstream of the loading stations. It is desirable that slight movement between the partitions and the side wall occurs in order to maintain a self-cleaning ability as the belt passes around the driving and reversing wheels. If the side walls and the partitions were to be joined to each other this would result in the formation of dead corners at the junctions thereof. This would result in material getting lodged at this junction and eliminate inefficient discharge. Constant circulation of the conveyor belt would also result in dynamic stresses in these junctions and cause fatigue in the material.

The discharge of the conveyed material is effectively assisted by virtue of the fact that the upwardly disposed driving stations are so arranged that the partitions are orientated at least vertically downwardly or even rearwardly. The conveyed material is therefore not entrained on the belt because of the conveying velocity of the belt. The tensioning pulley 22 permits increased working or movement of the conveyor belt parts and improvement of the discharge. The intrinsically very high discharge rate is improved still further by the striking apparatus, the striking effect of which may be regulated and which in its strongest setting is able to strike from the conveyor belt, material which is difficult to treat.

The operating noise is low because in the described embodiment the conveyor belt is constructed of rubber, plastics or the like and all parts of the said conveyor belt are fixedly joined by adhesive joining or vulcanisation and have no movable joints or screw fastenings. The working noises are therefore practically confined to those resulting from the impact of the conveyed material on the conveyor belt and those resulting from the discharge of the conveyed material. Linings within the funnels and chutes may still further reduce these noises.

Since the conveyed material may not only be advantageously loaded but may also be efficiently guided over the vertical distance in the upward direction and may also be efficiently discharged at the top. There is no need for providing the elevator conveyor with cladding. Accordingly, all movable parts are easily accessible and their design is such that maintenance requirements are as slight as those of ordinary belt conveyors.

To the extent to which the conveyed material is not coarse-grained, it is possible for the conveying rate, already intrinsically high, to be improved still further by the use of the co-circulating covering belt in the vertical section. It is however possible to dispense with the covering belt because the increase of the conveying rate may usually be achieved by reducing the distance between the partitions disposed at an acute angle on the conveyor belt. The use of a covering belt for the elevator conveyor is envisioned primarily when the characteristics of the conveyed material, for example dust development and other facts, make it appear advisable to employ a covering belt.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. An elevator conveyor comprising an endless conveying belt, a plurality of driving wheels arranged in spaced relation to one another, said belt engaging said wheel so as to be movably guided thereon, partitions mounted on the interior surface of the conveyor belt, side walls extending adjacent to marginal edges of the belt and having a substantially corrugated configuration, said partitions being mounted on said conveyor belt so as to form an acute angle with the plane defined by the conveyor belt, the ends of each of said partitions disposed contiguous to the oppositely disposed corrugated side walls without being fixedly joined thereto, said conveyor belt having its longitudinally extending marginal edges being disposed outside said side walls such that the adjacent surfaces thereof operatively engage said driving wheels; the elevator conveyor further comprising a covering belt, at least two driving drums situated coaxially relative to correspondingly positioned driving wheels and being journaled separately thereof, said covering belt positioned to cover the conveyor belt and being co-movable and in engagement with the substantially corrugated side walls, whereby the conveyor is substantially closed by engagement of said covering belt with said side walls.

2. An elevator conveyor as in claim 1 wherein the corrugations of the side walls are disposed at substantially the same acute angles with the conveyor belt plane as is formed by the partitions each of said partitions mounted on said belt to engage two oppositely disposed corrugation troughs of the side walls.

3. An elevator conveyor as in claim 1 further comprising a loading station positioned on the interior of the conveyor belt between two driving stations located adjacent the conveyor bottom said two driving stations positioned relative to one another such that said partitions being guided therebetween are substantially vertically oriented for receiving the conveyed material.

4. An elevator conveyor as in claim 1 wherein at least two driving stations are arranged adjacent the upper portion of the conveyor and in spaced relation to one another, said conveyor belt oriented in guided relation thereon such that partitions mounted on said belt are oriented in an approximately, vertically, inverted position.

5. An elevator conveyor as in claim 4 further comprising a discharge station mounted below the conveyor belt path between said two upper driving stations, whereby material is transferred by gravity from the conveyor belt to the discharge funnel.

6. An elevator conveyor as in claim 1 further comprising a striker means mounted to operatively engage the external surface of the conveyor belt, said striker means mounted above the conveyor belt path between a pair of driving stations disposed adjacent the upper portion of the conveyor.

7. An elevator conveyor as in claim 1 further comprising a plurality of idler rollers engaging predetermined portions of the conveyor belt, whereby the proper tension of the conveyor is maintained.

8. An elevator conveyor as in claim 1 further comprising a trough extending between a discharge station and a load station and arranged in communicating relation to emptied conveyor pockets.

* * * * *

UNITED STATES PATENT AND TRADEMARK OFFICE
CERTIFICATE OF CORRECTION

PATENT NO. : 3,881,590
DATED : May 6, 1975
INVENTOR(S) : Karl Hartmann

It is certified that error appears in the above-identified patent and that said Letters Patent are hereby corrected as shown below:

Column 3, line 34, indicate " around X, i.e., "x"

Column 4, line 58, "     "    "   "   "   "

Column 4, line 44, delete "of the contact"

Column 4, line 59, indicate " around X, i.e., "x"

Column 4, line 66, "     "    "   "   "   "

Signed and Sealed this

Fourteenth Day of September 1976

[SEAL]

Attest:

RUTH C. MASON
*Attesting Officer*

C. MARSHALL DANN
*Commissioner of Patents and Trademarks*